Patented Feb. 15, 1944

2,341,891

UNITED STATES PATENT OFFICE 2,341,891

DIHYDROXY - MONOARYLAMINOANTHRA-QUINONES AND A PROCESS FOR PREPARING THEM

Alexander J. Wuertz and David X. Klein, Wilmington, Del., assignors to E. I. du Pont de Nemours & Company, Wilmington, Del., a corporation of Delaware No Drawing. Application August 23, 1941,
Serial No. 408,072

5 Claims. (Cl. 260—380)

This invention relates to the preparation of new and valuable 1,5-dihydroxy-4-arylaminoanthraquinones, and has for its object the preparation of 1,5-dihydroxy-4-arylaminoanthraquinones by a simple and economical process whereby relatively pure products are obtained without resort to complicated purification methods.

We have found that 1,4,5-trihydroxyanthraquinone, when reduced to the leuco form can be condensed with arylamines of the benzene series, in an inert liquid diluent by heating to a temperature of from about 80 to 120° C., in the absence of a catalyst, to give high yields of a relatively pure 1,5-dihydroxy-4-arylaminoanthraquinones.

We have found the 1,5-dihydroxy-4-arylaminoanthraquinones to be particularly useful for dyeing cellulose acetate and for coloring plastic materials such as the alkyl alkacrylate polymers. When used in the coloring of cellulose acetate these colors appear to be completely fast to gas fumes, which is a very desirable property and one in which the present types of acetate dyes are deficient. They also exhibit a very high degree of light fastness on cellulose acetate. These colors have also been found to be very stable in the presence of benzoyl peroxide, making them particularly suitable in the coloring of alkyl alkacrylate resins, for when they are incorporated with the monomer they are not decomposed or altered during the polymerization step in the presence of the benzoyl peroxide polymerization catalyst. These new colors are also useful as intermediates in the preparation of other dyes. They may be converted to acid wool dyes by sulfonation.

Various inert liquid diluents particularly those in which the reactants have some solubility may be employed in the process for preparing these compounds. As examples of these diluents may be mentioned alcohols, alcohol ethers, pyridine and water or mixtures of such solvents.

The following examples are given to illustrate the invention. The parts used are by weight.

Example 1

10.3 parts of leuco-1,4,5-trihydroxyanthraquinone, 7.53 parts of meta-aminobenzyl alcohol, and 25 parts of Cellosolve are heated together at 90 to 95° C. for 12 hours. After cooling, the product is filtered and washed with 95% denatured alcohol. A yield of 10.6 parts of leuco dihydroxy m-methylol-anilinoanthraquinone is obtained. By oxidizing with 5 parts of nitrobenzene at 140 to 150° C. in the presence of a small amount of piperidine the 1,5-dihydroxy-4-m-methylol-anilinoanthraquinone may be isolated as a crystalline substance. This product has a melting point of 229° C. and a nitrogen content of 3.81%.

Example 2

10.3 parts of leuco 1,4,5-trihydroxyanthraquinone, 7.45 parts of aniline and 25 parts of pyridine are heated to 95° C. for 2 hours. After cooling, the precipitated crystalline leuco compound is filtered off, washed with a little pyridine, and then with 95% denatured alcohol. The cake is transferred to a flask containing 320 parts of 95% denatured alcohol and 5 parts of caustic soda. After heating to 75° C. air is blown through the mixture until the leuco compound is completely oxidized, and acetic acid is then added to neutralize. The suspension is then filtered hot, washed with alcohol and water, and dried. A yield of 8.775 grams of 1,5-dihydroxy-4-anilinoanthraquinone is obtained with a melting point of 253° C. and a nitrogen content of 4.12%.

Example 3

Substituting 8.2 parts of p-aminophenyl-ethyl alcohol for the amine in Example 1, and proceeding in a similar manner 7.89 parts of 1,5-dihydroxy-4-(p-beta-hydroxy-ethyl-anilino)-anthraquinone can be isolated which has a melting point of 177.8° C. and a nitrogen content of 3.56%.

Example 4

41.2 parts of leuco 1,4,5-trihydroxyanthraquinone, 33 parts of 4-methyl-3-methylol-aniline and 100 parts of Cellosolve are heated to 95° C. for 12 hours, and the mass is cooled and filtered. After working up the leuco product as in Example 1, 34.92 parts of 1,5-dihydroxy-4-(4'-methyl-3'-methylol-anilino)-anthraquinone are isolated, which has a melting point of 204° C. and a nitrogen content of 3.77%.

Example 5

Substituting 8.56 parts of p-toluidine for the amine in Example 1, and proceeding in a similar manner 6.45 parts of 1,5-dihydroxy-4-p-toluidino-anthraquinone may be isolated, which has a melting point of 222° C. and a nitrogen content of 4.22%.

Example 6

12.8 parts of leuco 1,4,5-trihydroxy-anthraquinone, 15 parts of p-amino-acetanilide, and 50 parts of Cellosolve are heated at 95° C. for 12 hours. After working up as in Example 1, 11.17 parts of 1,5-dihydroxy-4-(p-acetylamino-anilino)-anthraquinone are isolated, with a melting point of 283° C. and a nitrogen content of 6.83%.

*Example 7*

Substituting 15.3 parts of p-amino-phenoxy ethanol for the amine in Example 6 and working up as usual, 1,5-dihydroxy-4-(p-beta-hydroxyethoxy-anilino)-anthraquinone can be isolated which has a melting point of 213° C. and a nitrogen content of 3.46%.

*Example 8*

7.37 parts of 1,4,5-trihydroxy-anthraquinone, 37.4 parts of water, 3.05 parts of caustic soda, and 6.9 parts of sodium hydrosulfite are stirred together for 15 minutes, and 5.45 parts of m-aminobenzyl alcohol are added. After heating 24 hours the product is filtered, washed and dried. Oxidation with nitrobenzene gives a yield of 6.45 parts of 1,5-dihydroxy-4-m-methylol-anilinoanthraquinone.

Other arylamines may of course be substituted for those specifically mentioned in the examples. 3-amino-phenylacetonitrile, and 3-amino-benzylacetamide further illustrate the types of amines that have been found to operate successfully in the process to give the mono-arylamino-dihydroxyanthraquinones.

It is of course understood that by the term "arylamines" as employed herein, those carboxylic acid and sulfonic acid substituted derivatives which it is known do not condense with hydroxyanthraquinones under the conditions normally employed in preparing arylaminoanthraquinones are not included.

We claim:

1. 1,5-dihydroxy-4-arylaminoanthraquinones.
2. 1,5-dihydroxy-4(p-beta-hydroxyethylanilino)-anthraquinone.
3. 1,5-dihydroxy-4(p-beta-hydroxyethoxyanilino)-anthraquinone.
4. 1,5-dihydroxy-4(m-methylolanilino)-anthraquinone.
5. In the process of preparing 1,5-dihydroxy-4-arylaminoanthraquinones wherein leuco-1,4,5-trihydroxyanthraquinone is reacted with an arylamine, the step which comprises heating together a mixture consisting of leuco-1,4,5-trihydroxyanthraquinone, the arylamine and an inert organic diluent.

ALEXANDER J. WUERTZ.
DAVID X. KLEIN.